Patented Aug. 20, 1935

2,011,707

UNITED STATES PATENT OFFICE 2,011,707

PREPARATION OF TERPENE ESTERS OF DICARBOXYLIC ACIDS

Joseph N. Borglin, Wilmington, Del., assignor to Hercules Powder Company, Wilmington, Del., a corporation of Delaware No Drawing. Application June 4, 1932,
Serial No. 615,460

23 Claims. (Cl. 260—99)

This invention relates to the preparation of dibasic acid esters of secondary terpene alcohols and more particularly to the preparation of both the mono- and di-phthalates of secondary terpene alcohols.

As pointed out in the application filed by George M. Norman, May 22, 1931, Serial No. 539,420, cellulose ester compositions containing esters of phthalic acid, and more particularly the phthalic acid esters of secondary terpene alcohols, give rise to films of exceptional hardness and resistance to abrasion having superior weathering qualities and resistance to discoloration. In such compositions either the neutral or acid esters may be used. It is also found that secondary terpene alcohol esters of other dibasic acids have similar characteristics.

It is the broad object of the present invention to provide improved methods of preparing both neutral and acid dibasic acid esters of secondary alcohols, and specifically the phthalic esters of secondary terpene alcohols. Briefly, the improved methods involve direct esterification of the alcohols with the dibasic acid or its anhydride, for example, succinic, maleic, phthalic, tartaric, adipic, oxalic, sebacic, glutaric, malonic, etc. acids or anhydrides under optimum conditions to obtain high yields and products of a high degree of purity.

It is found that a substantially neutral borneol phthalate can be prepared by treating phthalic anhydride with about 40% excess borneol at a reaction temperature of 165–170° C. The resulting product has an acid number of about 35, and contains approximately 20% of borneol acid phthalate.

When the same reaction is conducted at 200° C. the reaction product contains only about 5% of acid phthalate.

The rate of reaction between excess borneol and phthalic anhydride is about 80–90 per cent complete in about thirty hours when the reaction takes place at 165–170° C. From this stage on the reaction is quite slow. That is, by continued heating for an additional forty hours the reaction progresses only a few percent further. Now butanol and other primary alcohols react more rapidly with phthalic anhydride than borneol or fenchyl alcohol. Accordingly, by conducting the reaction between borneol or fenchyl alcohol and phthalic anhydride for about thirty hours and then adding butanol a mixed phthalate results which is essentially neutral. That is, the resulting product is more neutral than when the borneol phthalate is not caused to further react with butanol. Other primary alcohols operate similarly to complete the formation of a substantially neutral ester. The mixed phthalate obtained above apparently consists of borneol (or fenchyl) neutral phthalate, dibutyl phthalate and borneol (or fenchyl) butyl phthalate.

The reaction involved in this invention may be desirably carried out in the presence of a suitable solvent for the terpene alcohol. Suitable solvents will be non-reactive in the process, will be immiscible with water and will have a boiling range of about 75–200° C., or preferably of about 100–150° C. The solvent will preferably be a hydrocarbon as toluene, xylene, benzene, or other aliphatic or aromatic hydrocarbon, though equivalents therefor are contemplated. The presence of the solvent will promote the elimination of water liberated during the reaction, as will be more particularly understood from the examples given hereinafter.

The above outlines the general characteristics of the reactions, not only for the preparation of phthalic esters but of other dibasic acid esters. However, the details will be best understood by reference to the following illustrative processes for the preparation of specific products.

*Di-bornyl phthalate (bornyl neutral phthalate)*

To forty parts of borneol contained in a suitable reaction vessel are added five parts of toluene. The mixture is heated until free from moisture and then allowed to cool. The purpose of this is to thoroughly dehydrate the borneol in order to promote the rate of esterification after the subsequent addition of the phthalic anhydride. By admixing the borneol with toluene, xylene, or some other aromatic or aliphatic hydrocarbons of comparable boiling range, boiling of the mixture effects the substantially complete removal of the water. By condensing the evolved vapors and using suitable separating apparatus the water may be removed from the distillate and the hydrocarbon permitted to flow back into the reaction vessel for use.

After removal of water, as above, 12 parts of phthalic anhydride are added. The mixture is then heated for about 84 hours at a temperature of 165–170° C. During the progress of the reaction when the second carboxyl group of the phthalic anhydride is combined with the alcohol water is liberated and is carried over to the condenser with the toluene vapors, separation being then effected and the toluene being returned to the reaction vessel as already indicated. The resulting product is sparged with steam for the removal of hydrocarbon and unreacted borneol. The remaining mass is then drawn off. A yield of 98.3% has been obtained by this process. The product has an acid number of 8.6 and a melting point of 130–135° C. The borneol neutral phthalate thus produced readily colloided nitrocotton.

Mono-bornyl phthalate (bornyl acid phthalate)

To 200 parts of dry borneol (dried as indicated above by boiling with toluene) are added 170 parts of phthalic anhydride and about 100 parts of toluene. This charge is heated during eight hours at a temperature of 165–170° C. The product is sparged with steam for removal of toluene and borneol. The resulting product (yield about 75%) consists primarily of mono-borneol phthalate (borneol acid phthalate), has an acid number of 116.2 and readily colloided nitrocotton in the presence of alcohol.

Di-fenchyl phthalate (fenchyl neutral phthalate)

To 25 parts of fenchyl alcohol are added about 100 parts of toluene. This mixture is then boiled in the manner indicated above for removal of water. There are then added 75 parts of phthalic anhydride so that about 63% excess fenchyl alcohol is available. This reaction mass is heated during 45 hours at a temperature of 165–170° C.

The resulting reaction mass is sparged with steam for the removal of volatile constituents and is then drawn off into a suitable container. About an 89% yield of a product has been thus obtained having the following composition:

|  | Percent |
|---|---|
| Fenchyl acid phthalate | 22.7 |
| Fenchyl neutral phthalate | 77.3 |

The above product has an acid number of 68 and readily colloided nitrocotton in the presence of alcohol.

Mono-fenchyl phthalate (fenchyl acid phthalate)

189 parts of fenchyl alcohol and about 100 parts of toluene are boiled to remove water. There are then added 148 parts of phthalic anhydride and the reaction mass is heated about 8 hours at a temperature of 165–170° C. The resulting product is then sparged with steam for removal of the volatile alcohol and toluene. A 67% yield of acid phthalate has been obtained by the practice of this process, the product having an acid number of 245 and a melting point of 102–103° C. and readily colloided nitrocotton.

Mixed fenchyl-bornyl phthalate

To 600 parts of pine oil fraction, or a mother liquor containing 37.5% secondary alcohols (borneol and fenchyl alcohol) was added 50 parts of phthalic anhydride and about 100 parts of toluene. The reaction mixture was heated during forty hours at a temperature of 165–170° C. The resulting reaction mass was then sparged for the removal of volatile constituents. The resulting product had the following composition:

|  | Percent |
|---|---|
| Acid phthalates | 19.3 |
| Neutral phthalates | 80.7 |

The product had an acid number of 38.2 and readily colloided nitrocotton. The product apparently consisted of fenchyl and borneol acid phthalates, fenchyl and borneol neutral phthalates and the mixed fenchyl-borneol neutral phthalate. This last compound has a structure which consists of phthalic acid having one carboxyl esterified with borneol and the other carboxyl by the fenchyl radical.

Mixed bornyl-butyl phthalate

To 33.7 parts of dry borneol are added 12 parts of phthalic anhydride and 6 parts of toluene. This reaction mass is then heated during one hour at a temperature of 165–170° C. At this stage water of reaction begins to appear indicating that one carboxyl has been esterified by the borneol nucleus and that the other carboxyl of phthalic acid was beginning to be esterified. Ten parts of butanol are then added and the heating continued during another twenty-six hours. By reason of this the second carboxyl is esterified by the butanol group which esterifies the phthalic acid much more rapidly than borneol with the resulting production of mixed borneol-butyl phthalate.

The resulting product is sparged with steam for removal of the volatile alcohols and toluene. The resulting product had an acid number of 12.3, a saponification number of 165.6, melting point soft and colloided nitrocotton more readily than borneol neutral phthalate. The latter compound when saponified does not give a true saponification number, the result being much too low. In the case of butyl phthalate the saponification number is readily obtained by the standard method. Naturally, a mixed borneol butyl ester will give a higher saponification number than borneol neutral phthalate. By the above procedure esters with acid numbers as low as one can be obtained. The product representing 99.4% yield of mixed borneol butyl ester apparently consisted of borneol neutral phthalate, butyl neutral phthalate and the mixed borneol-butyl phthalate.

Mixed fenchyl-butyl phthalate

To 400 parts of fenchyl alcohol were added 140 parts of phthalic anhydride and about 100 parts of toluene. This reaction mass was heated during twenty-two hours at a temperature of 165–170° C. At this stage water of reaction appeared and about 10 parts of butanol were added and the heating continued during an additional eighteen hours. The resulting product was then sparged with steam for removal of volatile constituents. The resulting product had an acid number of 17.2, a saponification number of 188.3 and a melting point soft and readily colloided nitrocotton. The product apparently consisted of fenchyl neutral phthalate, butyl neutral phthalate and the mixed butyl phthalate. The latter compound would have the structure of phthalic acid wherein one carboxyl is esterified by the fenchyl nucleous and the other carboxyl by the butyl nucleus.

The various neutral terpene phthalates mentioned above may be treated to remove acid phthalates and phthalic acid by reason of the fact that both phthalic acid and the acid phthalates readily react with alkali to give a water soluble salt. On the other hand, the neutral phthalates are substantially unchanged by cold alkali treatment although, of course, saponification takes place slowly if the neutral phthalates are heated with alkali. After cold treatment with alkali the resulting mass is filtered whereby the alkali salts pass into the filtrate and the neutral phthalates are retained by the filter medium. By washing with water and drying the neutral phthalate may be obtained in substantially pure condition.

If the phthalates are made in iron equipment, the resulting product is contaminated with this metal resulting in an increase in color. This iron can be removed by dissolving in toluene or other suitable solvent and heating with an alcoholic solution of oxalic acid, drawing off the spent alcohol solution, washing with water, and evaporating the toluene or other solvent. The resulting product is greatly improved insofar as color is concerned.

Further purification of terpene phthalates may be effected by distillation under reduced pressure. For example, distillation of the neutral phthalate may be effected from a bath maintained at a temperature of 200-300° C. under a pressure of 15 mm. As a result of such distillation high yields of the order of 97% may be obtained, the distillate being quite light in color.

In carrying out the process indicated above the toluene may be replaced by other hydrocarbons or neutral substances capable of dissolving a reaction mixture and having boiling points higher than the boiling point of water. For example, xylenes may be used, also terpene hydrocarbons and cuts of petroleum hydrocarbons boiling at approximately 100-150° C.

While temperatures of the order mentioned in the specific example are preferably used, temperatures between 150° and 210° C. result in rapid esterification. Temperatures below this range likewise result in esterification but at slower rates.

To complete the neutralization of acid terpene phthalate, methyl, ethyl, propyl or amyl alcohols may be substituted for the butyl alcohol mentioned in the above examples. In the case of lower boiling alcohols the heating should be conducted under pressure so that high temperatures may be used with resulting rapid reaction.

The processes described above are applicable to the formation of phthalic acid esters of other secondary terpene alcohols besides those mentioned. However, borneol and fenchyl alcohol have been specifically mentioned as reagents inasmuch as their esters are of primary importance.

The preparations of phthalic acid esters have been considered in considerable detail since they are of primary importance and since they illustrate the details involved in the preparations of other esters of dibasic acids such as the borneol or fenchyl alcohol esters of succinic, tartaric, adipic, oxalic, sebacic, maleic, glutaric, malonic and other dibasic acids. These acids or their anhydrides are readily esterified with borneol, fenchyl, or other terpene alcohol, toluene or other suitable solvent being used to assist in the removal of water of reaction and to promote contact between the acid and alcohol. As examples of the preparation of esters of dibasic acids other than phthalates, the following may be cited:

Di-bornyl succinate 200 parts of succinic acid, (for which the anhydride may be substituted) 800 parts of borneol and 100 parts of toluene are refluxed for 40 hours at 190-200° C., a short reflux column being used to permit part of the toluene to return continuously to the reactants, washing down sublimed borneol, the major portion of the toluene being returned only from time to time after separation of water. After the reaction period the ester may be steam distilled to remove unreacted borneol, giving a 97% yield of ester. The latter may be distilled under reduced pressure giving a 94% yield of very pale dibornyl succinate, having an acid number of 14.5.

Di-bornyl or di-fenchyl maleate

Dibornyl maleate may be similarly prepared by heating 125 parts of borneol, 25 parts of maleic anhydride, and 25 parts of toluene for 40 hours at 140-150° C. After purification as above the product may be obtained having an acid number of 3.6. Difenchyl maleate may be prepared in a similar manner. Instead of using maleic anhydride, maleic acid may be used in both cases.

Mixed esters of the aliphatic dibasic acids may be prepared by the same general methods used as above described for the preparation of fenchyl-bornyl phthalate, bornyl-butyl phthalate, or fenchyl-butyl phthalate.

Other terpene alcohol esters of dibasic acids may be prepared in similar fashions, whether the dibasic acids are aliphatic or aromatic. Substituted dibasic acids give esters by methods similar to those above, and it will be understood that in the following claims substituted acids are to be considered as equivalents of the simple acids.

The various esters may be used in the manner described in the Norman application above referred to.

Since the dibasic acids or their anhydrides may be used interchangeably in the production of esters in accordance with the invention, the terms "acid" and "anhydride" are used equivalently in the following claims.

What I claim and desire to protect by Letters Patent is:

1. The method of preparing a terpene ester of a dicarboxylic acid including heating, at a temperature above 100° C., a secondary terpene alcohol with the acid in the presence of a solvent for the reactants which is non-reactive in the process, immiscible with water, and has a boiling point of from about 75° C. to 200° C.

2. The method of preparing a terpene ester of a dicarboxylic acid including heating, at a temperature above 100° C., a secondary terpene alcohol with the acid in the presence of a liquid aromatic hydrocarbon having a boiling point above that of water.

3. The method of preparing a terpene ester of a dicarboxylic acid including heating, at a temperature above 100° C., a secondary terpene alcohol with the acid in the presence of toluene.

4. The method of preparing a terpene ester of phthalic acid including heating, at a temperature above 100° C., a secondary terpene alcohol with phthalic anhydride in the presence of a liquid aromatic hydrocarbon having a boiling point above that of water.

5. The method of preparing a terpene ester of phthalic acid including heating, at a temperature above 100° C., a secondary terpene alcohol with phthalic anhydride in the presence of toluene.

6. The method of preparing a bornyl ester of a dicarboxylic acid including heating, at a temperature above 100° C., borneol alcohol with the acid in the presence of a solvent for the reactants which is non-reactive in the process, immiscible with water, and has a boiling point of from about 75° to 200° C.

7. The method of preparing a fenchyl ester of a dicarboxylic acid including heating, at a temperature above 100° C., fenchyl alcohol with the acid in the presence of a solvent for the reactants which is non-reactive in the process, immiscible with water, and has a boiling point of from about 75° C. to 200° C.

8. The method of preparing a bornyl ester of phthalic acid including heating, at a temperature above 100° C., borneol with phthalic anhydride in the presence of a solvent for the reactants which is non-reactive in the process, immiscible with water, and has a boiling point of from about 75° C. to 200° C.

9. The method of preparing a fenchyl ester of phthalic acid including heating, at a temperature above 100° C., fenchyl alcohol with phthalic anhydride in the presence of a solvent for the reactants which is non-reactive in the process, immiscible with water, and has a boiling point of from about 75° C. to 200° C.

10. The method of preparing a mixed ester of a dicarboxylic acid by direct esterification including heating, at a temperature above 100° C., with the acid a mixture of two alcohols, one of which is a secondary terpene alcohol and the second of which is a lower aliphatic saturated monohydric alcohol, the reaction being carried out in the presence of a solvent for the reactants, which is non-reactive in the process, immiscible with water, and has a boiling point of from about 75° C. to 200° C.

11. The method of preparing a mixed ester of phthalic acid including heating, at a temperature above 100° C., phthalic anhydride with two alcohols one of which is a secondary terpene alcohol and the second of which is a lower aliphatic saturated monohydric alcohol, the reaction being carried out in the presence of a solvent for the reactants which is non-reactive in the process, immiscible with water, and has a boiling point of from about 75° C. to 200° C.

12. The method of preparing a mixed ester of phthalic acid including heating, at a temperature above 100° C., phthalic anhydride with fenchyl alcohol until a substantial amount of an acid ester is obtained, then adding a lower aliphatic saturated monohydric alcohol and continuing the heating, the reaction being carried out in the presence of a solvent for the reactants which is non-reactive in the process, immiscible with water and has a boiling point of from about 75° C. to 200° C.

13. The method of preparing a mixed ester of phthalic acid including heating, at a temperature above 100° C., phthalic anhydride with a secondary terpene alcohol until a substantial amount of an acid ester is obtained, then adding a lower aliphatic saturated monohydric alcohol and continuing the heating, the reaction being carried out in the presence of a solvent for the reactants which is non-reactive in the process, immiscible with water, and has a boiling point of from about 75° C. to 200° C.

14. The method of preparing a mixed ester of phthalic acid by direct esterification including heating, at a temperature above 100° C., phthalic anhydride with borneol until a substantial amount of an acid ester is obtained, then adding a lower aliphatic saturated monohydric alcohol and continuing the heating, the reaction being carried out in the presence of a solvent for the reactants, which is non-reactive in the process, immiscible with water, and has a boiling point of from about 75° C. to 200° C.

15. The method of preparing a mixed ester of a dicarboxylic acid including heating, at a temperature above 100° C., a secondary terpene alcohol with the acid until a substantial amount of an acid ester is obtained, then adding a lower aliphatic saturated monohydric alcohol and continuing the heating, the reaction being carried out in the presence of a solvent for the reactants, which is non-reactive in the process, immiscible with water, and has a boiling point of from about 75° C. to 200° C.

16. The method of preparing a terpene ester of a dicarboxylic acid including heating, at a temperature above 100° C., a secondary terpene alcohol with maleic acid in the presence of a solvent for the reactants which is non-reactive in the process, immiscible with water and has a boiling point from about 75° C. to 200° C.

17. The method of preparing a bornyl ester of a dicarboxylic acid including heating, at a temperature above 100° C., borneol with maleic acid in the presence of a solvent for the reactants which is non-reactive in the process, immiscible with water and has a boiling point from about 75° C. to 200° C.

18. The method of preparing a mixed ester of a dicarboxylic acid by direct esterification including heating, at a temperature above 100° C., a secondary terpene alcohol with the acid in the presence of butanol.

19. The method of preparing a mixed ester of a dicarboxylic acid by direct esterification including heating, at a temperature above 100° C., borneol with the acid in the presence of butanol.

20. The method of preparing a mixed ester of a dicarboxylic acid by direct esterification including heating, at a temperature above 100° C., fenchyl alcohol with the acid in the presence of butanol.

21. The method of preparing a mixed ester of a dicarboxylic acid by direct esterification including heating, at a temperature above 100° C., fenchyl alcohol with phthalic anhydride in the presence of butanol.

22. The method of preparing a mixed ester of a dicarboxylic acid by direct esterification, including heating, at a temperature above 100° C., a secondary terpene alcohol with phthalic anhydride in the presence of butanol.

23. The method of preparing a mixed ester of a dicarboxylic acid by direct esterification including heating, at a temperature above 100° C., secondary terpene alcohol with maleic acid in the presence of butanol.

JOSEPH N. BORGLIN.